United States Patent
Zhu et al.

(10) Patent No.: US 10,782,490 B1
(45) Date of Patent: Sep. 22, 2020

(54) FIBER OPTIC CONNECTOR

(71) Applicant: Amphenol Fiber Optic Technology (Shenzhen) Co., Ltd., Shenzhen, Guangdong Province (CN)

(72) Inventors: Ling-Hua Zhu, Shenzhen (CN); Xing-Fu Mo, Shenzhen (CN); Jinan Zhou, Shenzhen (CN); Anh Nguyen, Shenzhen (CN)

(73) Assignee: Amphenol Fiber Optic Technology (Shenzhen) Co., Ltd., Shenzhen (CN)

( * ) Notice: Subject to any disclaimer, the term of this patent is extended or adjusted under 35 U.S.C. 154(b) by 0 days.

(21) Appl. No.: 16/596,452

(22) Filed: Oct. 8, 2019

(30) Foreign Application Priority Data

Jun. 25, 2019 (TW) .............................. 108208113 U

(51) Int. Cl.
*G02B 6/38* (2006.01)
(52) U.S. Cl.
CPC ......... *G02B 6/3894* (2013.01); *G02B 6/3871* (2013.01)
(58) Field of Classification Search
None
See application file for complete search history.

(56) References Cited

U.S. PATENT DOCUMENTS

| | | | | |
|---|---|---|---|---|
| 5,074,637 A | * | 12/1991 | Rink | G02B 6/3891 385/56 |
| 5,297,227 A | * | 3/1994 | Brown | G02B 6/3825 385/138 |
| 5,444,806 A | * | 8/1995 | de Marchi | G02B 6/3825 385/75 |
| 6,612,750 B1 | * | 9/2003 | Bull | G02B 6/3825 385/55 |
| 9,557,493 B2 | * | 1/2017 | Wu | G02B 6/3869 |
| 9,810,863 B2 | * | 11/2017 | Akashi | G02B 6/421 |
| 9,915,789 B2 | * | 3/2018 | Beier | G02B 6/3893 |
| 10,551,571 B2 | * | 2/2020 | Liu | G02B 6/3825 |
| 2018/0143381 A1 | * | 5/2018 | Liu | G02B 6/38 |
| 2020/0012050 A1 | * | 1/2020 | Takano | G02B 6/3825 |

* cited by examiner

*Primary Examiner* — Jerry Rahll
(74) *Attorney, Agent, or Firm* — Burris Law, PLLC

(57) ABSTRACT

A fiber optic connector includes a connecting unit having a plurality of positioning grooves and a cover unit having a plurality of positioning blocks. The cover unit is operable to rotate relative to the connecting unit between an engaged position, where the positioning blocks are respectively disposed in the of said positioning grooves and are respectively and at least partially aligned with shoulder surfaces in the positioning grooves such that the cover unit is unable to move axially and forwardly relative to the connecting unit, and a separated position, where the positioning blocks are respectively misaligned from the shoulder surfaces to allow the cover unit to move axially and forwardly relative to the connecting unit.

9 Claims, 10 Drawing Sheets

FIBER OPTIC CONNECTOR

CROSS-REFERENCE TO RELATED APPLICATION

This application claims priority of Taiwanese Patent Application No. 108208113, filed on Jun. 25, 2019.

FIELD

The disclosure relates to a fiber optic connector, and more particularly to a coupling mechanism of a fiber optic connector.

BACKGROUND

A conventional M-connector series fiber optic connector comes in one of many configurations: flange-based, plug-based, and in-line. Components of the fiber optic connector, such as a main body and a cover thereof, are usually formed with threads, such that the components can be easily and sturdily coupled to one another via thread engagement. However, in order to fully remove or assemble the components, it is necessary to thoroughly disengage or engage the components as well via the threads, which can become time-consuming.

SUMMARY

Therefore, an object of the present disclosure is to provide a fiber optic connector that can alleviate the drawback of the prior art.

According one aspect to the present disclosure, the fiber optic connector includes a connecting unit and a cover unit. The connecting unit includes a hollow housing portion and a plurality of angularly and equidistantly spaced-apart protrusions. The housing portion surrounds a rotating axis and has a tubular front end and a rear end. The protrusions protrude radially and outwardly from the front end of the housing portion, and any adjacent two of the protrusions cooperatively define a positioning groove therebetween. Each of the positioning grooves has a guiding section at a front section thereof and a positioning section at a rear section thereof and in spatial communication with a rear end of the guiding section. Each of the guiding sections of the positioning grooves tapers in the axial direction toward a corresponding one of the positioning sections. The rear end of each of the guiding sections of the positioning grooves has a circumferential length smaller than that of the corresponding one of the positioning sections so as to form a shoulder surface therebetween that faces rearwardly.

The cover unit includes a cover body that removably covers the front end of the housing portion, and a plurality of angularly and equidistantly spaced-apart positioning blocks that protrude radially and inwardly from the cover body. The cover body is operable to rotate relative to the connecting unit between an engaged position, where the positioning blocks are respectively disposed in the positioning sections of the positioning grooves and are respectively and at least partially aligned with the shoulder surfaces in the positioning grooves such that the cover unit is unable to move axially and forwardly relative to the connecting unit, and a separated position, where the positioning blocks are respectively misaligned from the shoulder surfaces to thereby allow the cover unit to move axially and forwardly relative to the connecting unit and to be separated therefrom after the positioning blocks respectively pass through the guiding sections.

According to another aspect of the present disclosure, the fiber optic connector includes a cover unit and a connecting unit. The cover unit includes a hollow cover body and a plurality of angularly and equidistantly protrusions. The cover body surrounds a rotating axis and has a front end and a tubular rear end. The protrusions protrude radially and outwardly from the rear end of the cover body, and any adjacent two of the protrusions cooperatively define a positioning groove therebetween. Each of the positioning grooves has a guiding section at a rear section thereof and a positioning section at a front section thereof and in spatial communication with a front end of the guiding section. Each of the guiding sections of the positioning grooves tapers in the axial direction toward a corresponding one of the positioning sections. The front end of each of the guiding sections of the positioning grooves has a circumferential length smaller than that of the corresponding one of the positioning sections so as to form a shoulder surface therebetween that faces forwardly.

The connecting unit includes a housing portion that has a tubular front end and that is removably sleeved by the cover body of the connecting unit, and a plurality of angularly and equidistantly spaced-apart positioning blocks that protrude radially and inwardly from the housing portion. The cover body is operable to rotate relative to the connecting unit between an engaged position, where the positioning blocks are respectively disposed in the positioning sections of the positioning grooves and are respectively and at least partially aligned with the shoulder surfaces in the positioning grooves such that the cover unit is unable to move axially and forwardly relative to the connecting unit, and a separated position, where the positioning blocks are respectively misaligned from the shoulder surfaces to thereby allow the cover unit to move axially and forwardly relative to the connecting unit and to be separated therefrom after the positioning blocks respectively pass through the guiding sections.

BRIEF DESCRIPTION OF THE DRAWINGS

Other features and advantages of the disclosure will become apparent in the following detailed description of the embodiment with reference to the accompanying drawings, of which.

Figure 3:
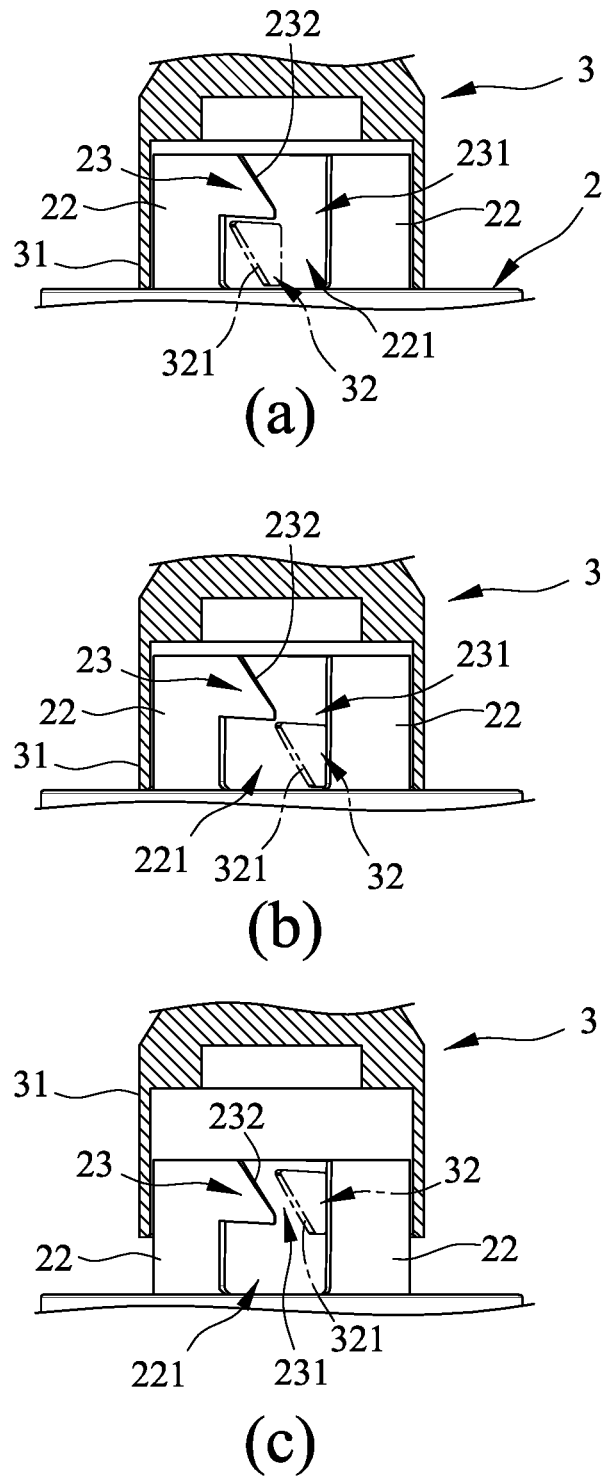
Figure 4:
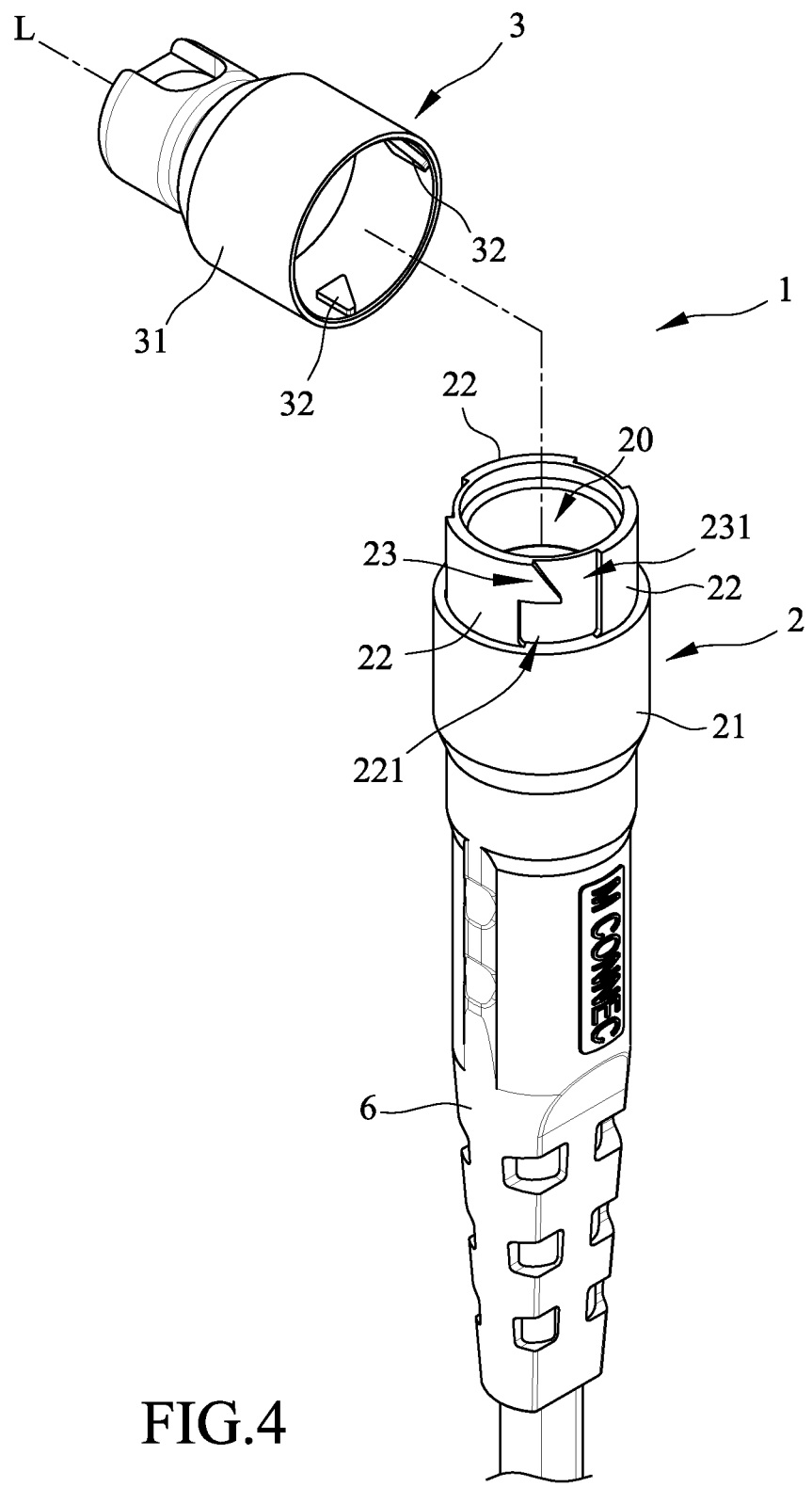
Figure 5:
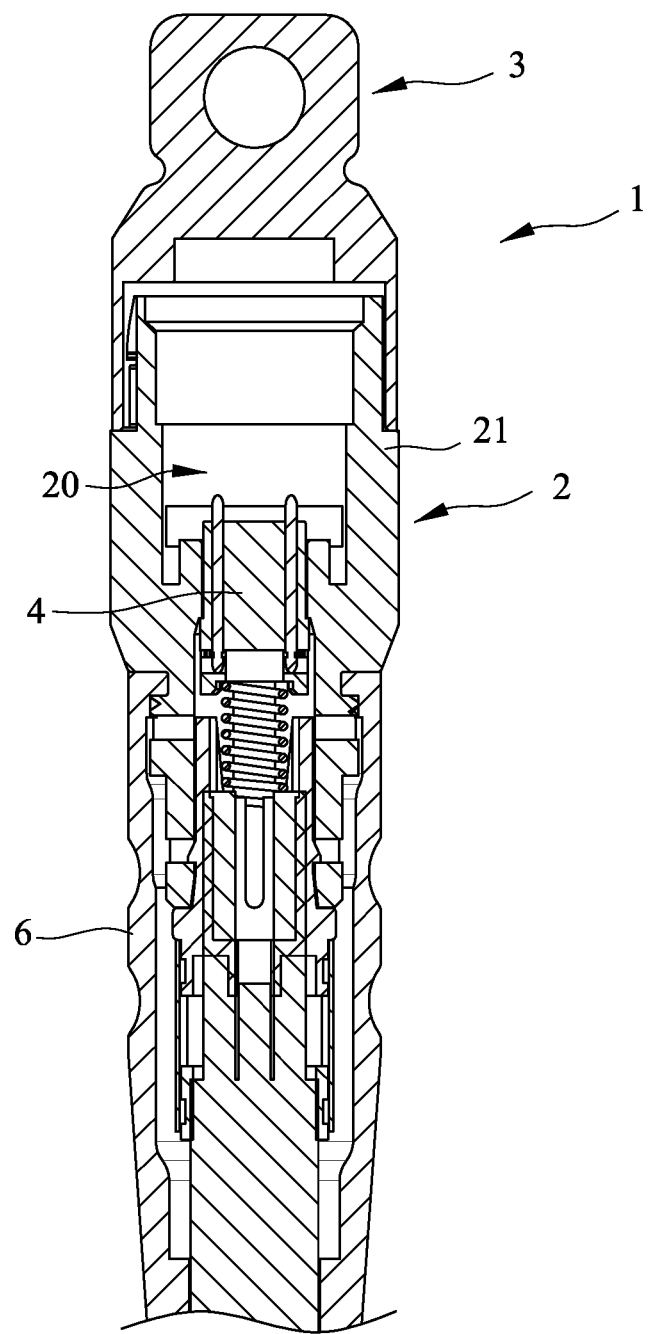
Figure 6:
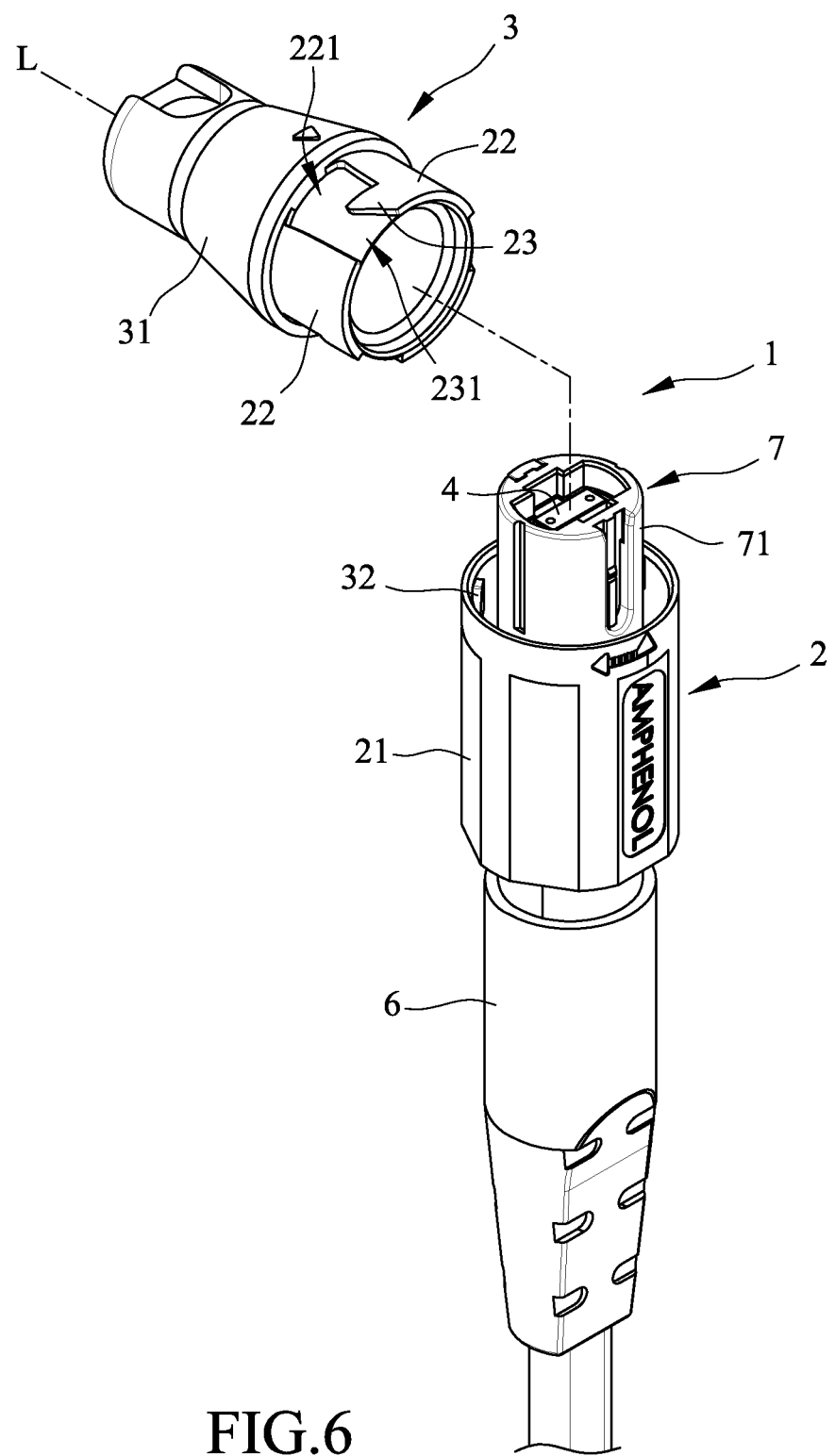
Figure 7:
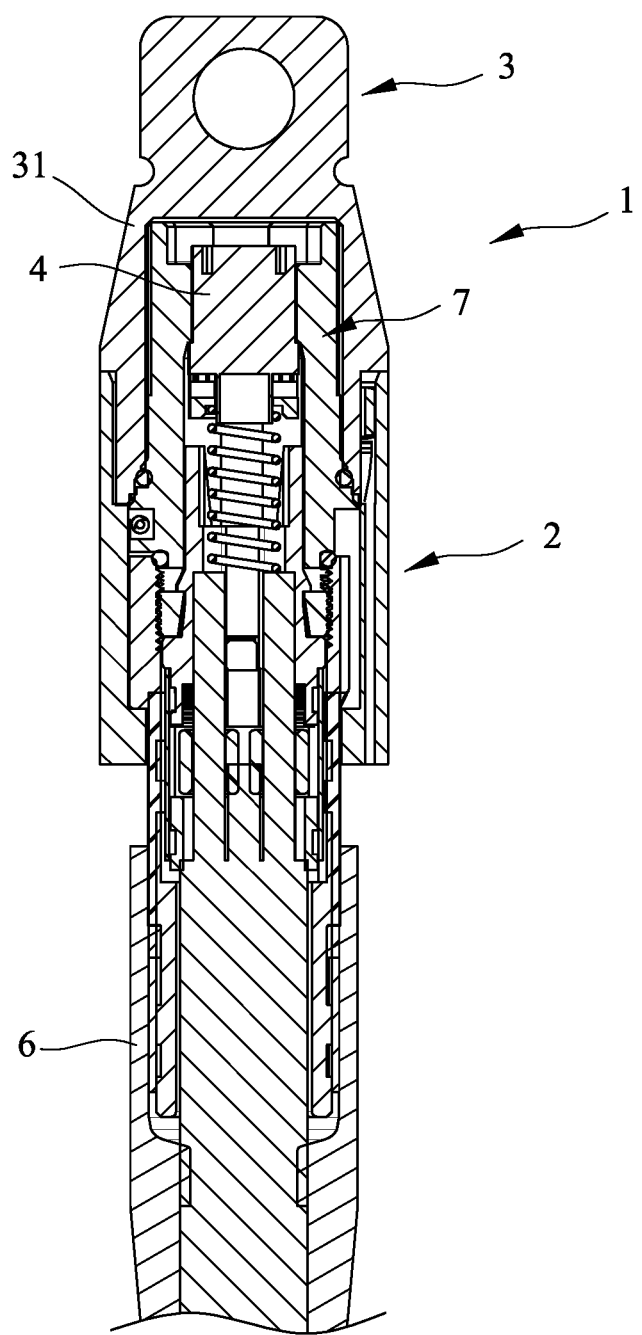
Figure 8:
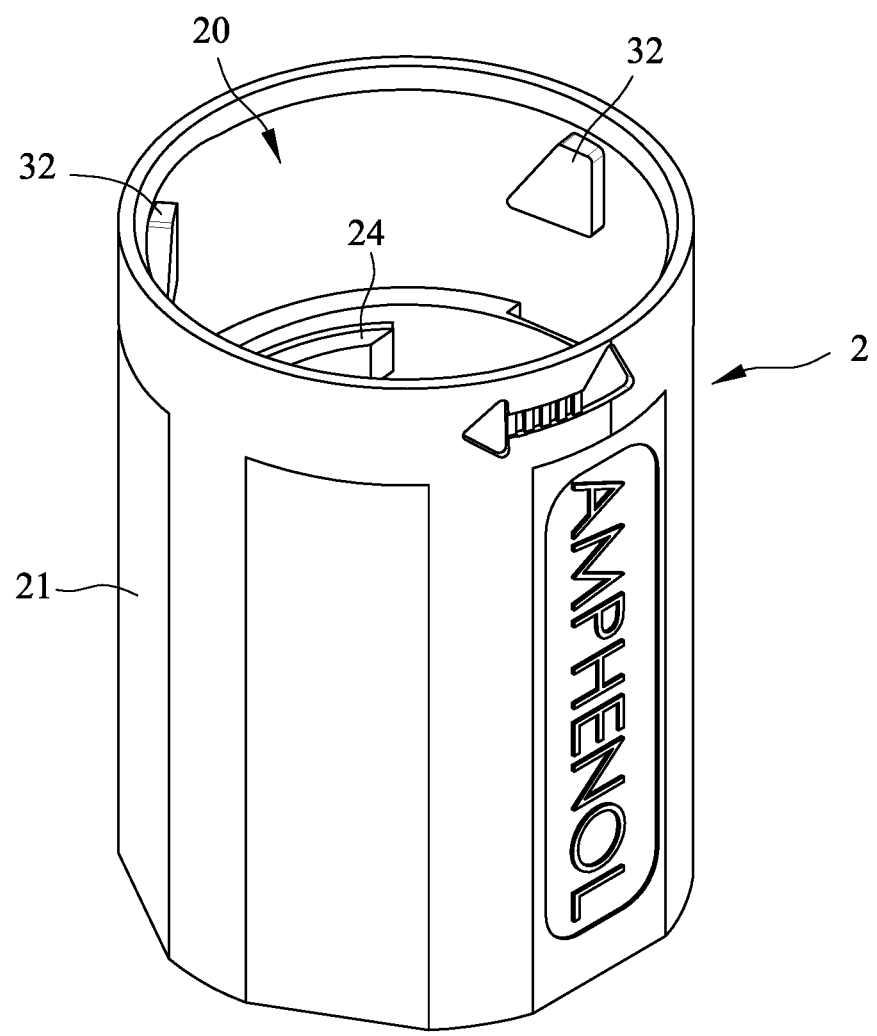
Figure 9:
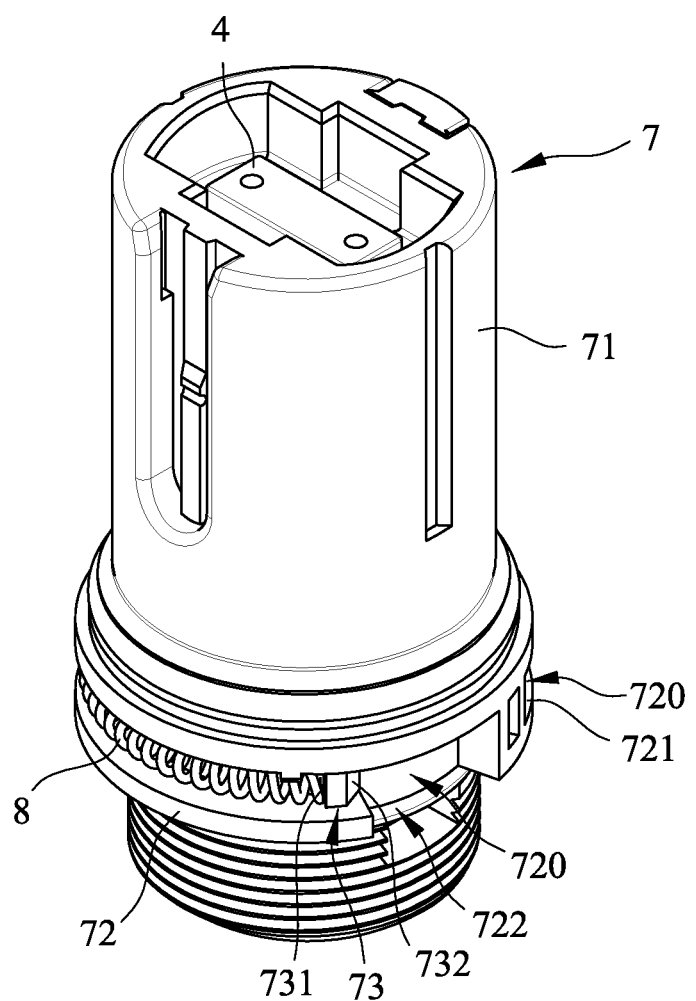

Part (a) of FIG. 3 is a fragmentary sectional side view of the first embodiment, illustrating a cover body of a cover unit at an engaged position;

Part (b) of FIG. 3 is another fragmentary sectional side view illustrating the cover body at a separated position;

Part (c) of FIG. 3 is still another fragmentary sectional side view illustrating the cover body being separated from the connecting unit;

FIG. 4 is a partly exploded perspective view of a second embodiment of the fiber optic connector;

FIG. 5 is a fragmentary sectional side view of the second embodiment;

FIG. 6 is a partly exploded perspective view of a third embodiment of the fiber optic connector;

FIG. 7 is a fragmentary sectional side view of the third embodiment;

FIG. 8 is a perspective view of a connecting unit of the third embodiment;

FIG. 9 is a perspective view of a mounting seat of the third embodiment; and

Figure 10:
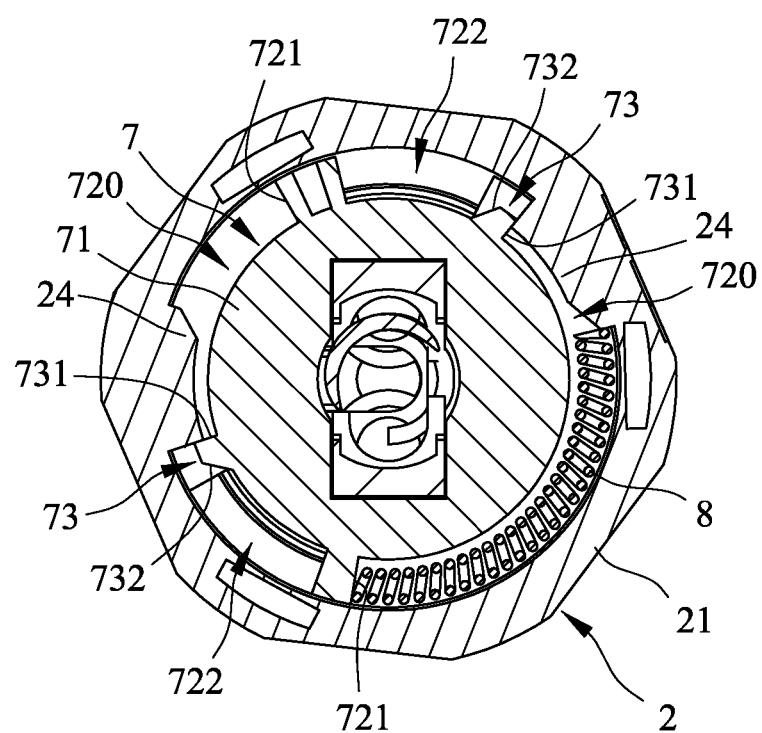

FIG. 10 sectional front view, illustrating an assembly of the connecting unit and the mounting seat of the third embodiment.

DETAILED DESCRIPTION

Before the disclosure is described in greater detail, it should be noted that where considered appropriate, reference numerals or terminal portions of reference numerals have been repeated among the figures to indicate corresponding or analogous elements, which may optionally have similar characteristics.

Figure 1:
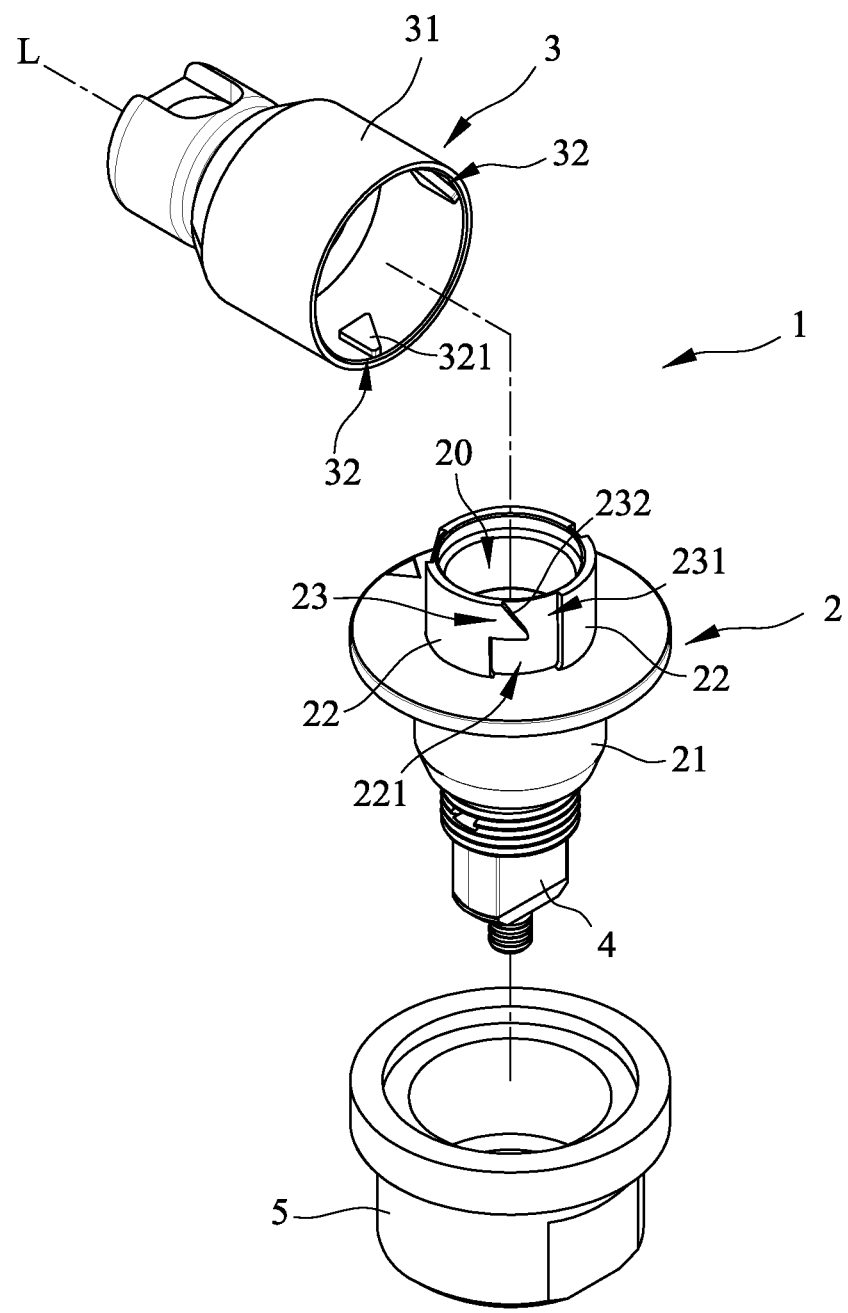
FIG. 1 is a partly exploded perspective view of a first embodiment of a fiber optic connector according to the disclosure.
Figure 2:
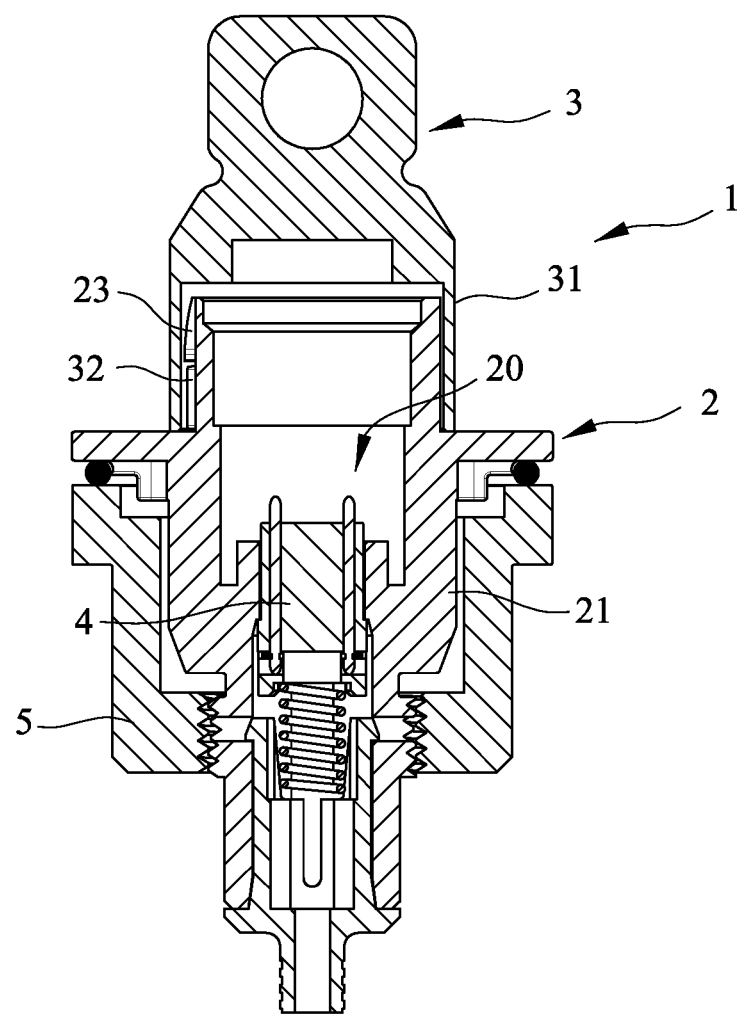
FIG. 2 is a sectional side view of the first embodiment.

Referring to FIGS. 1 to 3, a first embodiment of a fiber optic connector 1 according to the disclosure is a flange-based fiber optic connector, and includes a connecting unit 2, a cover unit 3, a ferrule module 4, and an annular seat 5 that is mounted to the ferrule module 4 and that surrounds the connecting unit 2.

The connecting unit 2 includes a hollow housing portion 21 that defines and surrounds an inner space 20 therein extending axially along a rotating axis (L) and that has a tubular front end and a rear end, and a plurality of angularly and equidistantly spaced-apart protrusions 22 that protrude radially and outwardly from the front end of the housing portion 21.

Any adjacent two of the protrusions 22 cooperatively define a positioning groove therebetween, which has a guiding section 231 at a front section thereof and a positioning section 221 at a rear section thereof and in spatial communication with a rear end of the guiding section 231. In each of the positioning grooves, the guiding section 231 tapers in the axial direction toward the positioning section 221, and the rear end of the guiding section 231 has a circumferential length smaller than that of the positioning section 221 so as to forma shoulder surface 233 therebetween that faces rearwardly. Each of the protrusions 22 has a hook portion 23 formed with the shoulder surface 233 and a guiding surface 232 that is inclined in such a way that the guiding surfaces 232 of the hook portions 23 of the protrusions 22 respectively and partially define the guiding sections 231 of the positioning grooves.

The cover unit 3 includes a cover body 31 that removably covers the front end of the housing portion 21, and a plurality of angularly and equidistantly spaced-apart positioning blocks 32 that protrude radially and inwardly from the cover body 31. Each of the positioning blocks 32 has an inclined surface 321 that is inclined to be complementary to the guiding surface 232 of a respective one of the hook portions 23. The ferrule module 4 is plugged to the rear end of the housing portion 21 of the connecting unit 2 and extends into the inner space 20 of the housing portion 21. In the first embodiment, the annular seat 5 is threadedly engaged to the connecting unit 2.

Referring to FIG. 3, the cover body 31 of the cover unit 3 is operable to rotate relative to the connecting unit 2 between an engaged position (see part (a) of FIG. 3) and a separated position (see part (b) of FIG. 3). When the cover body 31 is at the engaged position, the positioning blocks 32 are respectively disposed in the positioning sections 221 of the positioning grooves and are respectively at least partially aligned with the shoulder surfaces 233 in the positioning grooves along the rotating axis (L) such that the cover unit 3 is unable to move axially and forwardly relative to the connecting unit 2, thereby allowing the cover unit 3 to be fixedly sleeved to the connecting unit 2 and to cover the inner space 20 of the connecting unit 2 for protecting the ferrule module 4. When the cover body 31 is at the separated position, the positioning blocks 32 are respectively misaligned from the shoulder surfaces 233 to thereby allow the cover unit 3 to move axially and forwardly relative to the connecting unit 2 and to be separated therefrom after the positioning blocks 32 respectively pass through the guiding sections 231 (see part (c) of FIG. 3) for the inner space 20 to become accessible. In comparison to the conventional threaded coupling mechanism of the fiber optic connector, the fiber optic connector 1 of the first embodiment is more time-efficient, as it requires at most one cycle of rotation for engaging and disengaging the cover unit 3 and the connecting unit 2. In addition, when the cover unit 3 sleeves to the connecting unit 2, the inclined surfaces 321 of the positioning blocks 32 respectively cooperate with the guiding surfaces 232 of the hook portions 23 to guide the positioning blocks 32 into respective ones of the guiding sections 231.

Referring to FIGS. 4 and 5, a second embodiment of the fiber optic connector 1 is similar to the first embodiment. In the second embodiment, the ferrule module 4 is partly mounted to the inner space 20 of the housing portion 21 of the connecting unit 2. Instead of including the annular seat 5 (see FIG. 1), the fiber optic connector 1 further includes a sleeving member 6 that is connected to the rear end of the housing portion 21 of the connecting unit 2. The second embodiment is a plug-based fiber optic connector, and offers the same benefit as the first embodiment.

Referring to FIGS. 6 to 8, a third embodiment of the fiber optic connector 1 is a line-in based optic fiber connector, and is similar to the second embodiment. However, in the third embodiment, the protrusions 22 are relocated to protrude outwardly from the rear end of the cover body 31 of the cover unit 3, and the positioning blocks 32 are relocated to protrude inwardly from the housing portion 21 of the connecting unit 2. Despite the relocation of the abovementioned elements, the coupling mechanism of the fiber optic connector 1 is essentially the same as that of the first and second embodiments.

In addition, referring further to FIG. 9, the third embodiment of the fiber optic connector 1 further includes a mounting seat 7 that is mounted inside the connecting unit 2 and that is for the ferrule module 4 to be mounted thereto, and a resilient member 8 that is mounted to the mounting seat 7. Referring back to FIG. 8, the connecting unit 2 further includes a plurality of angularly and equidistantly spaced-apart engaging blocks 24 (only one is shown in FIG. 8) that protrude inwardly from the housing portion 21 and that extend circumferentially. Referring to FIGS. 6, 9 and 10, the mounting seat 7 includes a seat body 71 that surrounds and restricts movement of the ferrule module 4, a plurality of protruded portions 72 that protrude outwardly from the seat body 71 and that define a plurality of circumferential grooves 720 thereamong, and a plurality of wedge portions 73 that are respectively disposed in the circumferential grooves 720 and that protrude radially and outwardly from the seat body 71. Each of the circumferential grooves 720 has a closed end 721 and an open end 722. Each of the wedge portions 73 is proximate to the open end 722 of a corresponding one of the circumferential grooves 720, and has a retaining end 731 that faces the closed end 721, and an tilted end 732 that is opposite to the retaining end 731 and that faces the open end 722. The resilient member 8 is mounted to one of the circumferential grooves 720, with two opposite ends of the resilient member 8 respectively abutting against a corresponding one of the protruded portions 72 and a corresponding one of the engaging blocks 24 (as shown in FIG. 10). When the mounting seat 7 is operated to be mounted inside the connecting unit 2, each of the engaging blocks 24 is disposed in the corresponding one of the circumferential grooves 720 by passing through the open end 722 thereof, and is disposed to be adjacent to the tilted end 732 of a corresponding one the wedge portions 73. Then, when the connecting unit 2 rotates relative to the mounting seat 7, each of the engaging blocks 24 moves circumferentially to be guided by the tilted end 732 of the corresponding one of the wedge portions 73 to pass therethrough and to be disposed to be adjacent to the retaining end 731 of the corresponding one of the wedge portions 73. Once past through, the engaging blocks 24 can hardly pass through the wedge portions 73 from the retaining ends 731 thereof to the tilted ends 732 thereof. As such, the engaging blocks 24 are respectively disposed between the corresponding one of the wedge portions 73 and the closed end 721 of the corresponding one of the circumferential grooves 720. It should be noted that one of the engaging blocks 24 is disposed in the circumferential groove 720 having the resilient member 8 mounted thereto, such that when the engaging block 24 passes through the corresponding one of the wedge portions 73 to be in contact with the resilient member 8, the engaging block 24 would be driven by a resilient force of the resilient member 8 to abut against the retaining end 731 of the corresponding one of the wedge portions 73 (see FIG. 10) to ensure that the mounting seat 7 is fixedly mounted inside the connecting unit 2.

Overall, the fiber optic connector 1 in the embodiments offers efficient coupling mechanism that does not heavily rely on threaded engagement. In addition, the third embodiment offers an alternative coupling mechanism of the fiber optic connector 1, while providing a mounting mechanism of the mounting seat 7 to the connecting unit 2 which ensures that the mounting seat 7 would not be easily detached therefrom.

In the description above, for the purposes of explanation, numerous specific details have been set forth in order to provide a thorough understanding of the embodiment. It will be apparent, however, to one skilled in the art, that one or more other embodiments may be practiced without some of these specific details. It should be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. A fiber optic connector comprising:
  a connecting unit including
    a hollow housing portion that surrounds a rotating axis (L), and that has a tubular front end and a rear end, and
    a plurality of angularly and equidistantly spaced-apart protrusions that protrude radially and outwardly from said front end of said housing portion, any adjacent two of said protrusions cooperatively defining a positioning groove therebetween, each of said positioning grooves having a guiding section at a front section thereof and a positioning section at a rear section thereof and in spatial communication with a rear end of said guiding section, each of said guiding sections of said positioning grooves tapering in the axial direction toward a corresponding one of said positioning sections, said rear end of each of said guiding sections of said positioning grooves having a circumferential length smaller than that of the corresponding one of said positioning sections so as to form a shoulder surface therebetween that faces rearwardly; and
  a cover unit including
    a cover body that removably covers said front end of said housing portion, and
    a plurality of angularly and equidistantly spaced-apart positioning blocks that protrude radially and inwardly from said cover body;
  wherein, said cover body is operable to rotate relative to said connecting unit between
    an engaged position, where said positioning blocks are respectively disposed in said positioning sections of said positioning grooves and are respectively and at least partially aligned with said shoulder surfaces in said positioning grooves such that said cover unit is unable to move axially and forwardly relative to said connecting unit, and
    a separated position, where said positioning blocks are respectively misaligned from said shoulder surfaces to thereby allow said cover unit to move axially and forwardly relative to said connecting unit and to be separated therefrom after said positioning blocks respectively pass through said guiding sections.

2. The fiber optic connector as claimed in claim 1, wherein said housing portion of said connecting unit surrounds and defines an inner space therein that extends axially along the rotating axis (L), said inner space becoming accessible when said cover unit is separated from said connecting unit.

3. The fiber optic connector as claimed in claim 2, further comprising a ferrule module that is partly mounted to said inner space of said housing portion of said connecting unit, and a sleeving member that is connected to said rear end of said housing portion of said connecting unit.

4. The fiber optic connector as claimed in claim 1, further comprising a ferrule module that is plugged to said rear end of said housing portion of said connecting unit, and an annular seat that is mounted to said ferrule module.

5. The fiber optic connector as claimed in claim 1, wherein each of said protrusions of said connecting unit has a hook portion formed with a guiding surface that is inclined in such a way that said guiding surfaces of said hook portions of said protrusions respectively and partially define said guiding sections of said positioning grooves, and each of said positioning blocks of said cover units has an inclined surface that is inclined to be complementary to said guiding surface of a respective one of said hook portions.

6. A fiber optic connector comprising
  a cover unit including a hollow cover body that surrounds a rotating axis (L), and that has a front end and a tubular rear end, and a plurality of angularly and equidistantly protrusions that protrude radially and outwardly from said rear end of said cover body, any adjacent two of said protrusions cooperatively defining a positioning groove therebetween, each of said positioning grooves having a guiding section at a rear section thereof and a positioning section at a front section thereof and in spatial communication with a front end of said guiding section, each of said guiding sections of said positioning grooves tapering in the axial direction toward a corresponding one of said positioning sections, said front end of each of said guiding sections of said positioning grooves having a circumferential length smaller than that of the corresponding one of said positioning sections so as to form a shoulder surface therebetween that faces forwardly; and a connecting unit including a housing portion that has a tubular front end and that is removably sleeved by said cover body of said connecting unit, and a plurality of angularly and equidistantly spaced-apart positioning blocks that protrude radially and inwardly from said housing portion;

wherein, said cover body is operable to rotate relative to said connecting unit between an engaged position, where said positioning blocks are respectively disposed in said positioning sections of said positioning grooves and are respectively and at least partially aligned with said shoulder surfaces in said positioning grooves such that said cover unit is unable to move axially and forwardly relative to said connecting unit, and a separated position, where said positioning blocks are respectively misaligned from said shoulder surfaces to thereby allow said cover unit to move axially and forwardly relative to said connecting unit and to be separated therefrom after said positioning blocks respectively pass through said guiding sections.

7. The fiber optic connector as claimed in claim 6, further comprising a mounting sea that is mounted inside said connecting unit, a ferrule module that is mounted inside said mounting seat, and a sleeving member that is connected to the rear end of said housing portion of said connecting unit, said ferrule module becoming accessible when said cover unit is separated from said connecting unit.

8. The fiber optic connector as claimed in claim 7, further comprising:

a resilient member that is mounted to said mounting seat;

wherein, said mounting seat includes a seat body that surrounds and restricts movement of said ferrule module, a plurality of protruded portions that protrude radially and outwardly from said seat body and that define a plurality of circumferential grooves thereamong, and a plurality of wedge portions that are respectively disposed in said circumferential grooves and that protrude radially and outwardly from said seat body, said resilient member being mounted to one of said circumferential grooves; and said connecting unit further includes a plurality of engaging blocks that are respectively disposed in said circumferential grooves and that are mounted to said housing portion, one of said engaging blocks being driven by a resilient force of said resilient member to abut against a corresponding one of said wedge portions.

9. The fiber optic connector as claimed in claim 8, wherein:

each of said circumferential grooves of said mounting seat has a closed end and an open end;

each of said wedge portions of said mounting seat has a retaining end that faces said closed end, and an tilted end that is opposite to said retaining end; and two ends of said resilient member respectively abut against a corresponding one of said protruded portions and a corresponding one of said engaging blocks, such that the corresponding one of said engaging block abuts against said retaining end of the corresponding one of said wedge portions.

\* \* \* \* \*